United States Patent Office 3,197,815
Patented Aug. 3, 1965

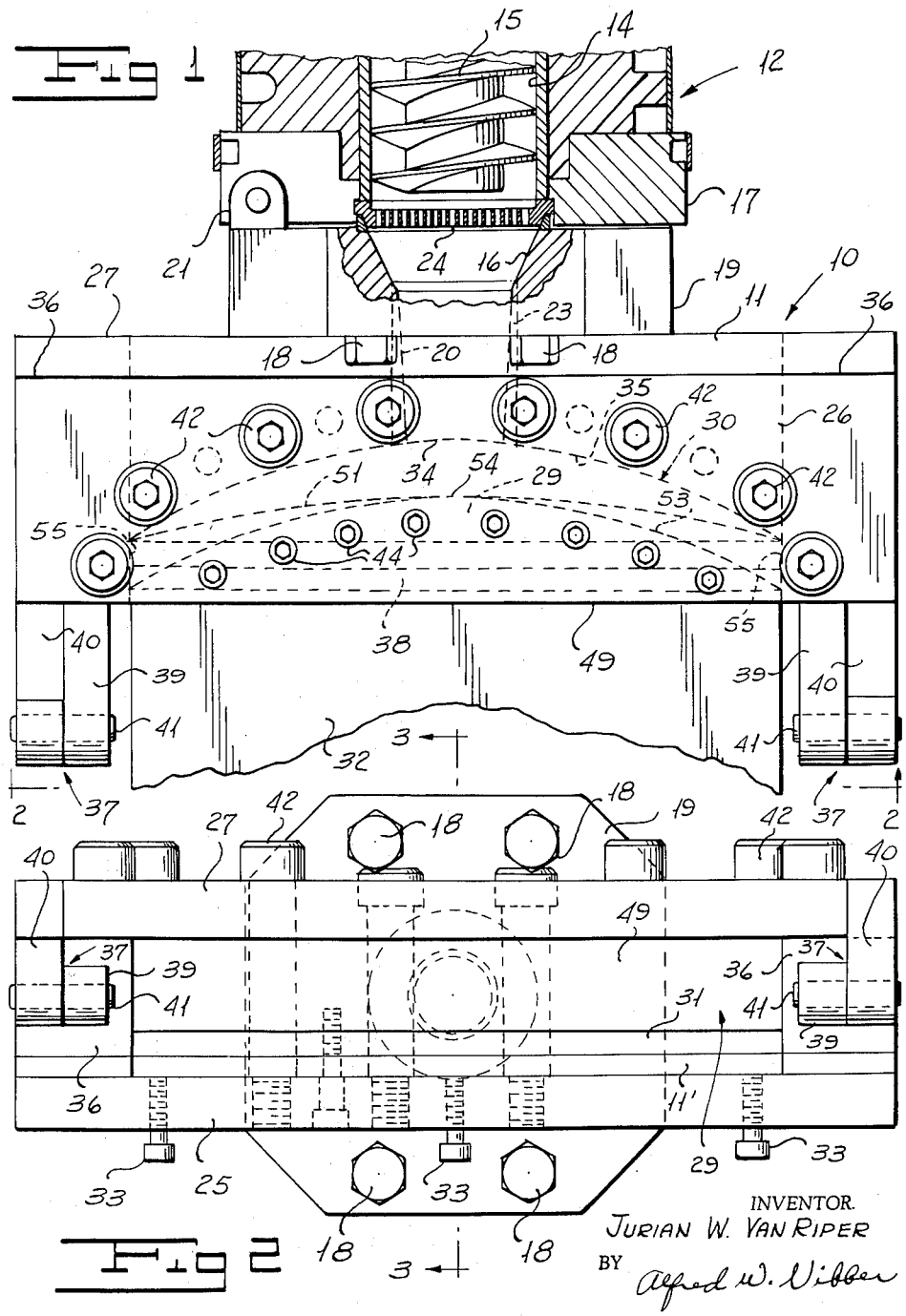

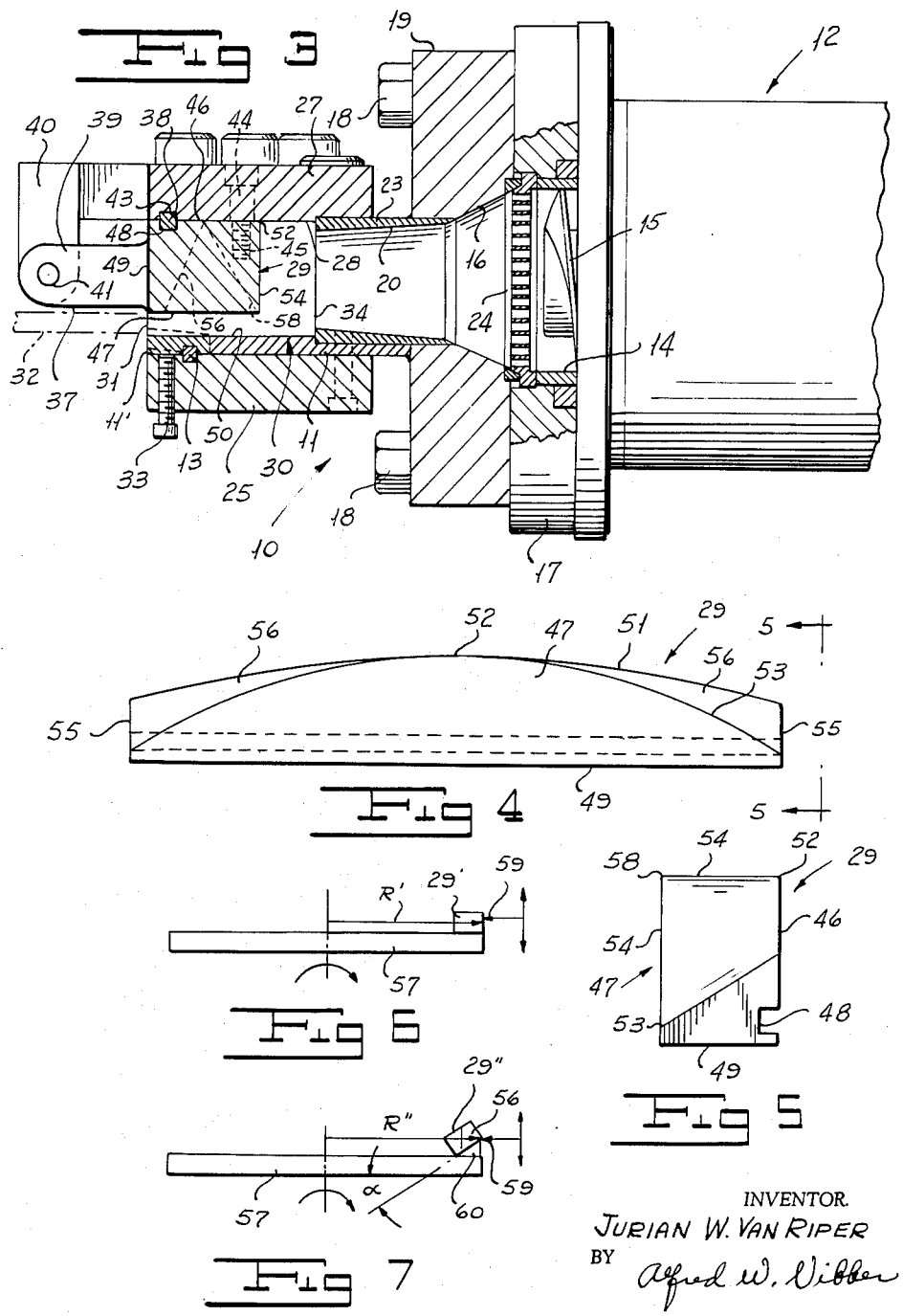

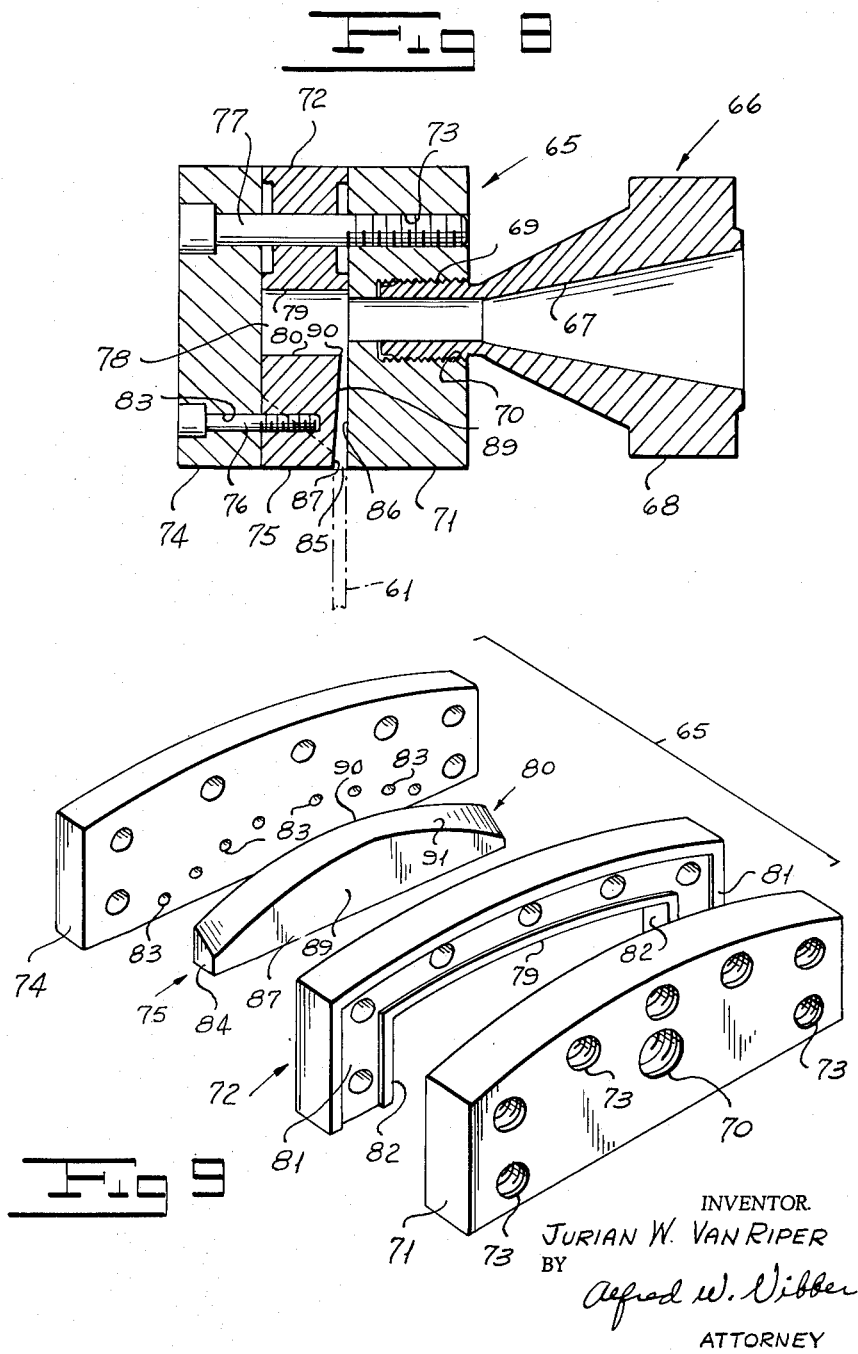

3,197,815
PLASTIC MATERIAL EXTRUSION HEAD
Jurian W. Van Riper, 208 Beechwood Road,
Ridgewood, N.J.
Filed Jan. 14, 1963, Ser. No. 251,396
13 Claims. (Cl. 18—12)

This invention relates to an improved apparatus for forming plastic material of laterally extended cross-section by extrusion through an opening functioning as a die.

The invention has among its objects the provision of an improved plastic material extrusion head for apparatus of the indicated character, such head being of simplified construction.

A further object of the invention lies in the provision of an improved plastic material extrusion head which incorporates novel means for distributing plastic material under pressure to an elongated opening functioning as a die whereby the extruded product may be made of the desired contour and thickness.

Another object of the invention is the provision of a plastic material extrusion head of the type indicated which is characterized by the ease with which it may be cleaned when necessary.

Yet a further object of the invention is the provision of a plastic material extrusion head which may readily be altered, when necessary, as when the character of the plastic material being extruded is changed, to produce an extruded product of predetermined contour and thickness, the construction of the head being such as to permit its ready alteration to produce an extruded product of different contour and thickness when desired.

A still further object is to provide a plastic material extrusion head of the indicated type which eliminates the need for trial and error in adjusting the head to form the same product as before stoppage of apparatus, upon the resumption of the extruding operation after a lay-down of the machine such as is occasioned by the end of a production run and/or cleaning of the machine.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view partially in horizontal section through a plastic material extruding apparatus provided with a sheeting head in accordance with a first disclosed embodiment of the extrusion head of the invention, the section being taken along the axis of the plastic material delivering bore in the apparatus, certain of the elements being shown in plan, the apparatus being shown empty of plastic material for simplicity of illustration;

FIG. 2 is a view in end elevation of the sheeting head of the apparatus of FIG. 1, the view being taken from the line 2—2 of FIG. 1 in the direction from the bottom to the top of FIG. 1, no plastic material being shown in or issuing from the head;

FIG. 3 is a view in vertical axial section through the sheeting head of FIGS. 1 and 2, the section being taken along the line 3—3 of FIG. 2, certain of the parts being shown in elevation;

FIG. 4 is a view in bottom plan of the flow block employed in the extrusion head of FIGS. 1–3, inclusive;

FIG. 5 is a view on a somewhat enlarged scale in end elevation of the flow block, the view being taken from the line 5—5 of FIG. 4;

FIG. 6 is a schematic view showing a first machining step employed in one method of formation of the curved surface of the flow block of FIGS. 4 and 5;

FIG. 7 is a schematic view showing a second machining step employed in such method of formation of the curved surface of the flow block of FIGS. 4 and 5;

FIG. 8 is a view in vertical axial section through a plastic material sheeting head in accordance with a second disclosed embodiment of the head of the invention, the section being taken along the axis of the plastic material delivering bore of a head supporting adapter associated with the head, certain of the elements being shown in elevation; and FIG. 9 is an exploded view in perspective of the parts making up the second illustrative embodiment of sheeting head in accordance with the invention.

The plastic material extrusion apparatus of the invention is adapted for the continuous production of plastic material in laterally extended form. The apparatus of the invention includes an extrusion head which is designed to be connected to a source of plastic material under pressure so that the plastic material flows into the head and thence outwardly therefrom through an elongated die which forms it into the laterially extended extruded material. Apparatus of this type has long been known. Serious difficulties have been encountered, however, in feeding the plastic material under pressure at the desired rates to the various zones of the die throughout its lateral extent. Such difficulties, among others, have prevented such apparatus from competing seriously with conventionally employed apparatus for forming extended thin gauge plastic sheets, such as apparatus employing rolling and calendering devices.

Other major difficulties with prior extrusion heads of the type indicated arise principally from the difficulty with which they are cleaned, and the difficulty of restoring them to satisfactory running condition after they have been shut down and cleaned. The parts which form the distributing chamber and delivery channel of such prior heads are of intricate shape. Because of this, it is difficult and time-consuming to remove plastic material therefrom during a cleaning operation, once the head has been opened, without injury to the parts of the head, since such parts are, in effect, interlocked with the plastic material in the head.

Further, a majority of such prior extrusion heads employ adjustable and/or distortable die-forming bars extending along the delivery orifice of the die. It is not unusual, with heads of this type, for an adjustment, after a head-cleaning operation, of the extrusion head by a highly skilled technician to require from four to six hours. Such adjustment requires the extrusion apparatus to be run continuously while the die is being adjusted. During such adjustment of the head, the extruded stock produced is scrap which must be reworked, repelleted, and reused if it is not to be a total loss. Such reworking and reuse of the extruded scrap material inevitably results in some degradation of the plastic material.

The novel extrusion head of the invention overcomes the above-outlined difficulties encountered in prior extrusion heads of the indicated type. It is of simple design, has relatively few parts, and is easy to make to close tolerances. It has an easily replaceable flow-controlling block, hereinafter termed a "flow block," which controls the rate of flow of plastic material toward the die or discharge orifice of the head at each lateral zone of the die. Such flow block may be easily removed and replaced by another flow block of appropriate contour and size when necessary, as occasioned by a change in the character of the material to be extruded, or a change in the contour and/or thickness of the material to be extruded.

The extrusion head of the invention is easily opened and cleaned, the parts of the head, when unfastened, being readily separable from the plastic material in the chamber and in the delivery passage of the die. When the die is again closed, as after having been cleaned or after the substitution of one flow block in the head for another, the head requires no adjustment in order for it to produce a fully satisfactory product having its contour and thickness well within predetermined acceptable tolerances.

The first disclosed embodiment of extrusion head in accordance with the invention, shown in FIGS. 1–5, inclusive, is a direct delivery sheeting head; such head is designated generally by the reference character 10. The second embodiment of extrusion head, shown in FIGS. 8 and 9, is also a sheeting head; it, however, by way of variation, is a side or right angle delivery head. The head shown in FIGS. 8 and 9 is designated generally by the reference character 65. Both sheeting heads 10 and 65, as will appear hereinafter, produce a sheet of uniform thickness.

In FIG. 1 the sheeting head 10 is shown attached to and fed by an extruding device of the screw type. The extrusion machine, which is of conventional type, has a barrel 12 with a longitudinal bore 14 therein. A driven stock screw 15 is disposed within the bore so as to plasticize and forward under high pressure plastic material which is fed thereto as through a hopper, not shown. The barrel of the machine is suitably temperature controlled as by electrical resistance heating means and cooling means (not shown), the heating means being disposed in grooves in the outer surface of the barrel within a sheath disposed thereabout.

Attached to the outer end of barrel 12 is a first fixed part 17 of the sheeting head 10, part 17 being attached to the barrel by conventional securing means, not shown. The main or base part of head 10, designated 19, is hingedly secured to part 17 by hinge means 21 so that part 19 of the head may be swung clockwise, as it is shown in FIGURE 1, after the securing means have been released, when it is necessary to open the outer end of barrell 14, as for cleaning the machine. Part 19 of the head is held in the position shown in FIG. 1, when the machine is in operative condition, by a plurality of studs 18 which extend through holes in part 19 of the head and into the part 17 secured to the barrel 12. The outer or forward portion of head 10, which contains a plenum chamber 30 and a die orifice 31, is secured to part 19 of the head as follows. A broad lower horizontal plate 11 is disposed with its rear central edge portion abutting and welded to the forward face of part 19, as indicated in FIG. 3. Plate 11 not only supports the forward portion of head 10, but forms the bottom of a plenum chamber 13 within such portion of the head.

Plenum chamber 30 is fed with plastic material forwarded thereto under pressure through a delivery passage of which a first part 16 is in the form of an outwardly tapered frusto-conical passage in part 19, passage 16 lying coaxial of bore 14 in barrel 12. Passage 16 merges at its outer end with the larger end of an outwardly gradually converging coaxial frusto-conical passage 20 in a sleeve 23 which extends into and is secured at its rear end to part 19 of the head 10, and which extends into and is secured at its forward end to the plenum chamber-forming forward portion of the head. A conventional screen 24 is disposed between the outer end of bore 14 and the entering end of passage 16 so that such screen is uncovered for removal and cleaning when the head part 19 is swung open about hinge 21 as described.

The plenum chamber 30, fed with plastic material through aligned passages 16 and 20, includes means for directing the flow of plastic material under pressure laterally outwardly in both directions within the plenum chamber and for then diverting such plastic material for travel at equal speeds in the various zones thereof located across the width of the plenum chamber and outwardly through a discharge orifice 31 functioning as a die. In this illustrative embodiment of the apparatus such discharge orifice or die 31 is of uniform width throughout its lateral extent so that the extruded product 32 issuing therefrom is in the form of a sheet of uniform thickness across its width. In the embodiment shown, a number of elements cooperate to form the plenum chamber, plastic material spreading and distributing means, and the discharge orifice or die. The main ones of such elements are the bottom plate 11, 25, an upper plate 27 which cooperates with the bottom plate, a flow block 29 which is secured to the upper plate 27, side-closing elements 36 secured to the bottom plate 11, 25, and a block 35 defining the rear wall of the plenum chamber.

The bottom plate 11, 25 is relatively stiff and rigid. Secured to the bottom plate is thick filler plate 26 (FIG. 1) which extends between the inner surfaces of the upper and lower plates 27 and 11, 25. The upper plate 27 is secured to plate 11, 25 so as to lie parallel thereto when the parts are in the operative position of FIGS. 1, 2, and 3. The upper plate 27 is formed so that its inner or lower face 28 lies parallel to and substantially spaced above the upper surface 31 of bottom plate 11, 25. A substantial portion of the forward part of the space between the upper and lower plates of the head is filled with the flow block 29 which, as shown, is secured to the lower face 28 of the upper plate 27. The remaining space between the upper and lower plates forms the plenum chamber 30, which is of laterally extended, laterally symmetrical, generally curved shape in plan. Such plenum chamber terminates at its forward lower edge in the laterally extended orifice or die opening 31 of uniform width, through which the extruded sheet 32 of uniform thickness issues. The forward or inner face 35 of plate 26 within plenum chamber 30 is in the form of a portion of the surface of a circular cylinder having its center of curvature on the center line of the passage 14 in FIG. 1. The inner end 34 or sleeve 23 generally lies flush with surface 35, as shown in FIG. 1.

Secured to the upper surface of lower plate 11, 25 along the edges thereof are the above-mentioned side edge closing blocks 36. The laterally inner side surfaces of blocks 36 accurately and sealingly fit against the outer side edges of the rear plate 26. When the head is in closed position, as shown in FIGS. 1, 2, and 3, the upper surfaces of blocks 36 on the lower plate fit accurately and sealingly against the lower surface of upper plate 27 along the side edges thereof to form a laterally sealed chamber.

The flow block 29 is of such length laterally of orifice 31 that it fits accurately and in flow-tight relationship with the inner side surfaces of blocks 36. The flow block 29 is held in position on the top plate by a series of laterally distributed studs 44 which extend through passages in the plate 27 and into threaded relationship with threaded passages 45 in the flow block.

The upper plate 27 with the flow block 29 attached thereto is attached to the bottom plate 11, 25 by hinge connections 37 formed between the opposite side edge portions of the upper and lower plates. In the embodiment shown, two laterally spaced parallel ears 39 extend forwardly from the forward edge portions of blocks 36, which, as we have seen, are attached to lower plate 11, 25. Two laterally spaced ears 40 which project forwardly and then downwardly from the forward edge of the upper plate 27 are disposed to receive the ears 39 accurately between them. A pintle pin 41 extends through each set of opposed ears 39, 40. When the parts of the sheeting head are in operative position, as shown, the top plate 27 and the flow block 29 secured thereto are forcibly held down by a series of laterally spaced studs 42 (FIGS. 1 and 2) which extend through openings in the top plate 27 and have threaded engagement with threaded passages in the lower plate 11, 25.

The shape of the flow block 29 and its manner of formation will be more readily understood upon consideration of FIGS. 4–7, inclusive. As shown in FIGS. 4 and 5, the flow block is of thick plate-like construction and is laterally symmetrical about a central line which is vertical in FIG. 4. Flow block 29 has extended parallel plane upper and lower surfaces 46 and 47, respectively. The outer end surface 49 of the flow block, which faces the reader in FIG. 2, is flat. The upper surface 46 of flow block 29 has the rear or inner edge 51 thereof in the shape of an arc of a circle, such arc having a radius which is appreciably longer than the radius of curvature of surface 35 at the rear of the plenum chamber, and a center which lies on the perpendicular passing through the central point 52 of such arc. The bottom surface 47 of flow block 29 has the rear edge 53 thereof in the form of an arc of a circle having a radius which is substantially smaller than the radius of the radius of curvature of arc 51, the center of arc 53 lying on the same vertical line as the center of arc 51. The central (geometrical) element 54 at the rear edge of flow block 29 is in the form of a vertical straight line which lies normal to the upper and lower surfaces 46 and 47 of the flow block. Laterally outwardly of such central element 54 of the rear surface of the flow block, the lower edge of the rear surface of such block is partially in the form of similar portions 56 of the surface of a right circular cylinder having a radius which is less than the radius of arc 51 and greater than the radius of surface 35, such right circular cylinder being tangent to the lower end 58 of the central vertical element 54 and being disposed at an angle α with respect to the central transverse plane which is normal to surfaces 47 and 49 of such block. To secure flow block 29 in the head against the very substantial thrust of the plastic material in the plenum chamber, the block is preferably keyed to the head, as shown. Thus an elongated key member 38 is disposed partially in a seat 43 in the lower surface of upper plate 27 and partially in a seat 48 in the upper surface of the block 29.

The flow block 29 may be conveniently formed in the manner schematically shown in FIGS. 6 and 7. A thick metal plate 29' having a thickness equal to the distance between the confronting parallel inner surfaces of the top and bottom plates 27 and 11, 25 of head 10 minus the maximum thickness of the plastic sheet 32 to be extruded by the head, and with surfaces 46 and 47 thereof parallel, is first machined so as to form the outer surface 49 and the parallel flat end surfaces 55 thereof. Following this, the plate is mounted upon the rotary table 57 (FIG. 6), for example, of a vertical boring mill and is then cut on its outer radial surface as by a lathe tool 59 which is traversed in a vertical direction and fed radially inwardly. The radially inward feeding of the tool is stopped when the outer edge surface of the workpiece, there designated 29', is in the form of a part of a right circular cylinder having a radius R' equal to that of arc 51.

The workpiece 29' is then remounted on the table 57 of the vertical boring mill, this time closer to the center of rotation of the table and tipped at an angle α with respect to the upper surface of the table. Such tipping of the workpiece may be accomplished, for example, by the use of one or more wedges 60 of appropriate angle disposed between the bottom surface of the workpiece and the table. The tool 59, which again is traversed vertically and fed radially inwardly by successive cuts upon the exposed outer edge portion of the workpiece, now designated 29'', forms the outer or rear edge of block 29'' into the shape of a second right circular cylinder having a radius R'' equal to the radius of curvature of surface 56. When the forming of surface 56 is completed, the tool 59 will have been fed radially inwardly until the thus formed second circular cylindrical surface 56 is tangent to the lower end 58 of the central (geometrical) element 54 on the rear surface of the finished flow block 29.

As we have seen, the plenum chamber 30 has a vertical rear end wall 35, into which passage 20 extends, which is in the shape of a laterally symmetrical portion of a right circular cylinder having a radius R which is smaller than the radius R' of the curved upper rear edge 51 of the flow block 29. In the preferred embodiment shown R'>R''>R.

The outer ends of arc 51 on block 29 intersect the outer ends of the rear end wall 35 of the plenum chamber at the inner surfaces of the side-closing blocks 36 of the head 10. The outer ends of arc 53 on the lower rear edge of the flow block 29 intersect the inner surfaces of blocks 36 a short distance rearwardly of the forward or outer end surface 49 of the flow block 29.

The flow block of the invention has the active, plastic material-diverting-and-distributing surface thereof of such shape that it may be formed by two simple machining operations; this makes it possible to form such surface with a high degree of accuracy. Since the upper and lower plates 27 and 11, 25 of head 10 and the flow block 29 thereof are of thick section, they remain free from any substantial local deflections under the high operative pressure of the plastic material to which they are subjected. Thus the parts of the head may be accurately formed initially and remain accurate throughout their useful lives.

When it is desired to clean the head 10, this may readily be accomplished in a relatively short time and without disturbing the accurate size and shapes of the plates and flow block forming the head. Thus after a cleaning operation, the head may be closed and the parts operatively secured, the machine again extruding a product which is accurate within commercial tolerances without the necessity of any tests or adjustments of the parts forming the head.

To open the head, it is necessary only to remove the studs 42 therefrom and to swing the upper plate 27, with the flow block 29 secured thereto, in a counterclockwise direction as such parts are shown in FIG. 3. The plenum chamber and the flow block present no re-entrant angles therein, so that it is necessary only to break the temporary surface bond between the plastic material and the parts of the head exposed to the interior of the plenum chamber when the head is thus opened. The plastic material remaining within the head may then be easily removed therefrom without any damage to the parts of the head.

The novel configuration of the flow block, as well as lending itself to easy formation by conventional machining methods, insures that the plastic material which flows from the plenum chamber 30 travels at substantially uniform speeds as it travels outwardly through the die orifice 31 formed between the lower surface 47 of the flow block and the upper surface 50 of the lower plate 11, 25. By way of non-limiting example, there are now given the dimensions of a satisfactory sheeting head made in accordance with the above described first embodiment of the present invention. The die orifice 31 has a lateral dimension of 30 inches and the orifice 31 has a maximum width or thickness of 1 inch to extrude a sheet 32 having a thickness of the same value. The radius R' of the arc 51 is 39 inches, the radius R'' of the lower arc 53 is 26 inches, the radius R of the rear end of the plenum chamber is 25 inches, and the angle α is 30 degrees.

The head 10 in the illustrative embodiment thereof is provided with a die orifice adjusting means of the type disclosed and claimed in the prior Van Riper application Serial No. 99,518, filed March 30, 1961, now Patent No. 3,080,608. Thus the outer or forward portion 11' of plate 11 is formed separate from the remainder of the plate but of the same vertical thickness as such remainder. Portion 11' forms an adjustable die block which, when lying horizontal as shown in full lines in FIG. 3, permits head 10 to extrude a sheet 32 of maximum thickness. The orifice can be adjusted, however, to extrude sheets of smaller thickness, by pivoting the outer or forward end of die block 11' upwardly to the desired extent by suitable adjustment of vertical studs 33 which are threaded into passages in plate 25. The upper ends of studs 33 abut the lower forward surface of adjustable die block 11'. An elongated key member 13 partially received in a recess in the upper surface of plate 25 and partially received in a recess in the lower surface of die block 11' prevents the latter from outward or forward movement with respect to plate 11 under the pressure of the forwardly flowing plastic material to which it is subjected. The contour of the upper edges of key member 13 and of the recess in die member 11' are such that the die member has freedom to turn clockwise (FIG. 3) within the range of adjustment thereof permitted by studs 33. At all times during and after such adjustment the upper rear edge of die element 11' remains in plastic-material-tight engagement with the upper forward edge of plate 11, the die member 11' rocking about the transverse line of engagement of such corners.

FIGS. 8 and 9 illustrate a second embodiment of plastic material extrusion head in accordance with the present invention. Such embodiment of extrusion head is likewise a sheeting head, the illustrative head being adapted to produce an extruded strip 61 of uniform section. The second embodiment of extrusion head, which is generally designated 65 in FIGS. 8 and 9, incorporates the same general novel features as those in the above described first embodiment. Head 65, however, is a side delivery head, that is, it delivers plastic material under pressure to the head at a direction at right angles to that which is delivered from the head as an extruded product. Head 65 also differs specifically from head 10 as to the manner of formation of the plenum chamber and the means whereby the parts forming the plenum chamber and the flow block disposed within the plenum chamber are secured together.

As shown in FIG. 8, the head 65 is connected to the outer end of an adapter 66 through which plastic material under pressure is delivered thereto. Adapter 66 may be similar to the adapter generally designated 20 in the prior Van Riper patent appplication Serial No. 100,175, filed April 3, 1961, now Patent No. 3,085,289. Such adapter is designed for attachment to the forward end of the barrel of a screw type extrusion machine in the manner shown in such prior application. Adapter 66, which has a rear thickened portion 68 for engagement by the means securing it to the barrel of the extrusion machine, has an initially frusto-conical and then cylindrical passage 67 extending therethrough. The forward or outer end of adapter 66 is threaded at 69, such threaded end being threadedly received in a central passage 70 in the rear or back plate 71 of the extrusion head 65.

As shown in FIGS. 8 and 9, the extrusion head 65 is composed of such back plate 71, a spacer arch 72 mounted in engagement with the outer edge portion of the forward or inner face of plate 71, and a front plate 74, the rear edge surface of which is in engagement with the forward surface of spacer arch 72. Elements 71, 72, and 74, which have the same external configuration, are held together in sealing relationship by a plurality of studs 77 (one shown in FIG. 8) which extend through passages in front plate 74 and spacer arch 72 and have threaded engagement with holes 73 in back plate 71. Secured to the rear or inner face of front plate 74 is a flow block 75, the connection between the front plate and flow block being by means of studs 76 (one shown in FIG. 8) extending through holes 83 in the front plate and threaded into passages in the flow block. The thus described rear plate, spacer arch, front plate, and flow block coact to form a laterally symmetrical plenum chamber 78 which is located, in the main, above the inner curved surface 80 of the flow block, below the inner curved surface 79 of the spacer arch, and between the confronting flat spaced rear and forward surfaces of plates 71 and 74, respectively. The inner end of the passage 70 in the back plate 71 is located centrally of head 65 and in full communication with the laterally central zone of the plenum chamber.

The flow block 75 can perhaps be most simply described as to its shape by the manner in which it is formed. Thus the block 75 is formed from a heavy metal plate having a thickness slightly less than the effective thickness of the spacer arch 72, the flow block 75 having a length such that its ends fit accurately in plastic material-tight relationship within the inner surfaces 82 of the vertical legs 81 of the spacer arch. The blank which is to form block 75 is formed initially of rectangular shape, have a length equal to the distance between surfaces 82 and a height equal to the height of block 75 at its lateral center.

Head 65 is formed with a die opening or orifice 85 of such configuration that it extrudes the above-described strip 61. Such orifice 85 is formed between the lower inner surface 86 of the rear plate 71 and the confronting inner surface 87 of the flow block 75. The die orifice is formed by bevelling off the rear surface of the described initial blank which is to form the block 75 along the plane of the central (geometrical) element 89 (FIG. 8). Such plane is tipped downwardly and forwardly, and extends at the requisite angle with respect to and distance from the forward broad face of the blank to form the die orifice-forming lip 87 on the lower rear edge of the blank.

The upper curved surface of block 75 is now finished. The radius of the arc of the upper rear edge 90 of surface 80 is somewhat greater than the radius of the inner curved surface 79 of the arch 72. The outer ends of surface 80 intersect the inner surfaces 82 of legs 81 of arch 72. The distance between the central horizontal lines or elements of surfaces 79 and 80 is at least equal to and preferably somewhat exceeds the diameter of the delivery passage 70, which is centered between such elements on surfaces 79 and 80. The vertical dimension of the outer side edges 84 of block 75 equals the vertical dimension of the inner surfaces 82 of the legs of the spacer arch 72.

Finally, to produce the finished contour of block 75, the block as machined thus far may be mounted on a table of a vertical boring mill, in a manner somewhat similar to that described in connection with FIG. 7 in the description of the first embodiment, and the rear surface of block 75 is machined to produce thereon two similar part-circular cylindrical surfaces 91 on the lower outer corners of the block, surfaces 91 having the same radius and being tipped with respect to the axes of surfaces 79 and 80 through an angle $\beta$. Surfaces 91, as shown in FIG. 8, are tangent to rear end 90 of the central line or element of the upper surface 80 of the block 75, and extend adjacent to the die-orifice forming lip 87 of the block 75. In the illustrative embodiment of the head of FIGS. 8 and 9, the radius of arc 80 exceeds that of surfaces 91, the radius of such surfaces, in turn, exceeding that of surface 79.

It will be seen that the extrusion head of FIGS. 1–7, on the one hand, and that of FIGS. 8 and 9, on the other, present the same general combination of elements, the heads differing primarily as to the manner in which the elements are mounted and secured together and the manner in which the plastic material under pressure is fed into the plenum chamber. A further difference presented in the second embodiment of extrusion head is the manner of formation of the die orifice of the head. In the head of FIGS. 1–7, inclusive, the die orifice is formed between the flat upper surface of the lower plate 25 and the parallel flat lower surface of the flow block 29. In the head of FIGS. 8 and 9, the die orifice is formed between the flat vertical inner surface of the back plate 71 and the forwardly slanting flat rear surface of the flow block 75. Both heads, however, present the following salient novel features.

The plenum chamber is formed between two flat parallel heavy plates and between a first part of a right circular cylinder and an intersecting parallel second right circular cylinder, the second cylinder having a radius which somewhat exceeds that of the first cylinder so that the resulting plenum chamber is generally of crescent shape. The elongated die orifice is disposed across the crescent of the plenum chamber and is fed with plastic material from the plenum chamber through a laterally extended delivery channel which is presented between a formation on one of the parallel plates of the head and extends toward the other parallel plates of the head. In both illustrative embodiments such formation is a flow-controlling block attached to the first plate and extending toward the second, the outer surface of the flow-controlling block being generally spaced from the second plate to form a passage in alignment with the die orifice. The flow-controlling block or flow block has the portion thereof adjacent the second plate and facing the plenum chamber of a modified shape such that the resulting delivery channel delivers plastic material at the same speed in each zone laterally of the die orifice.

In the illustrative extrusion heads the flow block, which may be considered as having been of uniform thickness initially, has the surface thereof confronting the plenum chamber modified so that the two opposite end portions of the block are in the form of portions of right circular cylinders having their axes tipped rearwardly toward the plenum chamber. Such cylindrical surfaces are tangent to the end of the central element of the rear surface of the flow block facing the plenum chamber, such end being that which is closer to the second plate of the head. As a result, such rear surface of the flow block is, in effect, progressively more highly bevelled at zones progressively further away from the lateral center of the die orifice, thereby tending to lead more plastic material into such laterally displaced zones of the die. Conversely, it will be seen that the flow block presents greater opposition to the flow of plastic material to the die orifice in zones approaching the lateral center of the die orifice. Such formation of the flow block, taken in conjunction with the fact that the plastic material must flow forwardly between the flow block and the second plate of the head for shorter distances at the edges of the die than at the center thereof results in a substantially uniform speed of flow of plastic material at all zones thereof throughout the extent of the die orifice.

Although the extrusion heads of the two illustrative embodiments have been shown as laterally symmetrical and as being fed with plastic material under pressure at their lateral centers, it will be understood that because of the fact that the heads produce uniform speeds of flow of plastic material throughout their widths, the heads may, if desired, be made as, in effect, one lateral half of the heads shown. Thus, for example, in the first embodiment of head the plenum chamber and die might be terminated adjacent one side of the delivery passage 34 in FIG. 1, thereby extruding a sheet of less width but retaining the novel combination and functional advantages of the heads there shown. Likewise, should it be desired to extrude a strip which is, in effect, only one lateral half of the strip 61 of FIG. 8, the head of FIGS. 8 and 9 may be made so that the die orifice includes only one side of the die orifice 85 and the rear and front plates spacer arch and flow block may be made of such size that the delivery passage 67, 70 of the head is located in direct communication with the larger end of the plenum chamber.

In each of the embodiments of the apparatus specifically illustrated and described herein the extrusion die or orifice of the plenum chamber has been of such contour as to form a single laterally extended extruded shape. Because of the accuracy of control of delivery of plastic material to the die or orifice of the extrusion head afforded by the apparatus of the invention, however, such apparatus advantageously lends itself to use with a die or orifice having a plurality of separate extruding passages for forming a plurality of separate extruded shapes of either the same or different sections.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A plastic material extrusion head for extruding plastic material in laterally extended sheet form, comprising spaced parallel plates having flat generally parallel confronting surfaces forming two sides of a plenum chamber, an end member and side members closing the rear end and the opposite sides, respectively, of the space between the plates and defining the rear end and the sides of the plenum chamber, the forward ends of the plates and the forward ends of the side members defining an elongated die orifice extending between the side members, the inner, plenum chamber defining surface of the end closure member being substantially in the form of a part of a right circular cylinder having its axis lying on a transverse plane through the die orifice, a flow-controlling block disposed between the plates and generally interposed between the plenum chamber and the die orifice, the flow-controlling block being affixed to one of the plates and spanning the distance between the side members, the flow-controlling block having a rear edge which is located in contact with the inner surface of the plate to which the flow-controlling block is attached, said rear edge of the flow-controlling block being substantially in the form of a part of a circle having its center lying in the same transverse plane through the die orifice as that on which the center of the circular cylindrical inner surface of the end closure member lies, means for introducing plastic material under pressure to the plenum chamber, and means for securing the plates, end and side members, and flow-controlling block together.

2. A plastic material extrusion head as claimed in claim 1, comprising means hingedly connecting the two plates together, whereby the said one plate and the flow-controlling block secured thereto may be swung away from the other plate, whereby to expose the interior of the head for cleaning.

3. A plastic material extrusion head as claimed in claim 2, wherein the flow-controlling block is detachably secured to the said one plate, whereby the flow-controlling block may be readily replaced in the head.

4. A plastic material extrusion head as claimed in claim 1, wherein the radius of the said rear edge of the flow-controlling block abutting the said one plate is substantially longer than the radius of said circular cylindrical inner surface of the end closure member.

5. A plastic material extrusion head as claimed in claim 4, wherein the means for introducing plastic material into the plenum chamber comprises an inlet port communicating with the plenum chamber at one zone thereof, and wherein the end of the said rear edge of the flow-controlling block which lies remote from the inlet port intersects the inner surface of one of the side closure members and the respective end of the circular cylindrical inner surface of the end closure member at substantially a common point on the respective side of the head, said point of intersection lying substantially spaced rearwardly from the respective end of the die orifice.

6. A plastic material extrusion head as claimed in claim 5, wherein the face of the flow-controlling block remote from the plate to which the flow-controlling block is attached lies close to the inner surface of the other plate.

7. A plastic material extrusion head as claimed in claim 6, wherein a portion of the rear surface of the flow-controlling block, which confronts the plenum chamber, is in the form of a part of a second right circular cylinder, said second right cylinder having its axis substantially contained in the plane containing the axis of the first recited right circular cylinder forming the inner surface of the end closure member, the axis of the second right circular cylinder being inclined at a marked angle with respect to the axis of the first right circular cylinder, whereby the said part of the second right circular cylinder deflects and guides the plastic material in its travel from the plenum chamber toward the outer edge of the die orifice which is laterally remote from the inlet port.

8. A plastic material extrusion head as claimed in claim 7, wherein the axis of said second right circular cylinder is inclined at an acute angle with respect to the direction of flow of plastic material from the plenum chamber toward the die orifice.

9. A plastic material extrusion head as claimed in claim 8, wherein the said end of the said rear edge of the flow-controlling block intersects the inner surfaces of its respective confronting side closure member and the end of the circular cylindrical inner surface of the end closure member at substantially a common point on said side of the head, said point of intersection lying substantially spaced rearwardly from the respective end of the die orifice.

10. A plastic material extrusion head as claimed in claim 1, wherein said transverse plane through the die orifice containing the axis of the right circular cylinder and the center of the circle passes through the lateral center of the die orifice.

11. A plastic material extrusion head as claimed in claim 10, wherein the rear surface of the flow-controlling block which confronts the plenum chamber is in the form of laterally spaced symmetrical parts of a second right circular cylinder.

12. A plastic material extrusion head as claimed in claim 11, wherein the face of the flow-controlling block confronting the other plate incline at an acute angle with respect to the direction of flow of plastic material from the plenum chamber toward the die orifice.

13. A plastic material extrusion head as claimed in claim 12, wherein the laterally central geometrical element of the rear surface of the flow-controlling block is in the form of a straight line parallel to and spaced across the plenum chamber from the laterally central geometrical element of the inner surface of the end closure member.

References Cited by the Examiner

UNITED STATES PATENTS

| | | | |
|---|---|---|---|
| 2,560,022 | 7/51 | Formaz | 18—12 |
| 2,628,386 | 2/53 | Tornberg | 18—12 |

FOREIGN PATENTS

| | | |
|---|---|---|
| 551,760 | 10/56 | Belgium. |
| 765,383 | 1/57 | Great Britain. |

WILLIAM J. STEPHENSON, *Primary Examiner.*

ROBERT F. WHITE, *Examiner.*